UNITED STATES PATENT OFFICE.

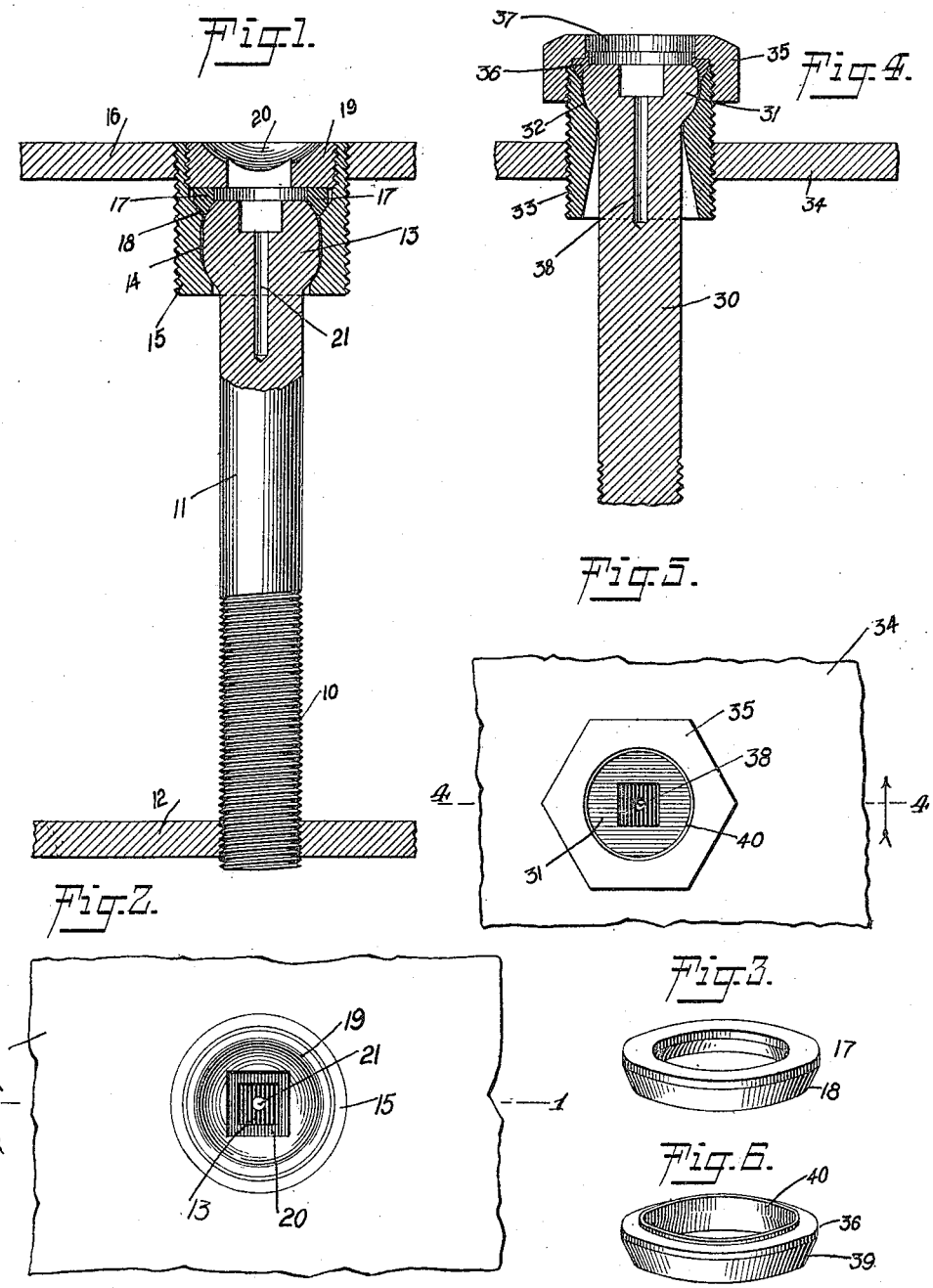

HARRY A. LACERDA, OF SCHENECTADY, NEW YORK.

STAY-BOLT.

1,182,690. Specification of Letters Patent. Patented May 9, 1916.

Application filed December 29, 1915. Serial No. 69,170.

*To all whom it may concern:*

Be it known that I, HARRY A. LACERDA, a citizen of the United States, and a resident of Schenectady, in the county of Schenectady and State of New York, have invented a new and Improved Stay-Bolt, of which the following is a full, clear, and exact description.

The object of the invention is to provide a new and improved stay bolt for the fire boxes of boilers and like structures, and arranged to permit convenient and quick periodical inspection of the stay bolt without requiring removal of any of the parts, at the same time rendering the stay bolt steam-tight and allowing movement of the boiler sheets in the direction of their plane without straining or otherwise injuring the stay bolt.

In order to accomplish the desired result, use is made of a plug screwing in the outer boiler sheet and having a ball and socket connection with the bolt, the latter being provided with the usual central opening, and a cap screwing on the plug and having a central opening through which access is had to the opening of the bolt.

A practical embodiment of the invention is represented in the accompanying drawings forming a part of this specification, in which similar characters of reference indicate corresponding parts in all the views.

Figure 1 is a sectional plan view of the stay bolt as applied and having a plug flush with the face of the outer boiler sheet, the section being on the line 1—1 of Fig. 2; Fig. 2 is a front elevation of the same; Fig. 3 is a perspective view of the packing ring; Fig. 4 is a sectional plan view of the stay bolt as applied and having a plug projecting on the face of the outer boiler sheet, the section being on the line 4—4 of Fig. 5; Fig. 5 is a face view of the same; and Fig. 6 is a perspective view of the packing ring for the stay bolt illustrated in Figs. 4 and 5.

The inner threaded end 10 of the stay bolt 11 screws in the inner boiler sheet 12, and the outer end of the stay bolt 11 is provided with a spherical head 13 fitting into a correspondingly shaped socket 14 formed in a screw plug 15 screwing in the outer boiler sheet 16 so as to be flush with the outer face thereof. A packing ring 17 engages the joint between the head 13 and the socket 14 at the outer face thereof to render the stay bolt steam-tight at the ball and socket connection just mentioned, and the said packing ring 17 is preferably made of copper or a similar soft material and its inner edge 18 is made V-shaped to snugly fit into a correspondingly shaped annular seat formed partly by the outer end of the head 13 and partly by the plug 15 adjacent the ball and socket joint. The packing ring 17 is engaged by a cap 19 which screws into the outer end of the plug 15. The cap 19 is provided with a central opening 20 to permit access to the usual opening 21 arranged centrally in the outer end of the stay bolt 11. It is understood that this opening 21 permits the escape of water or steam in case the stay bolt 11 is broken. By the arrangement described a ready inspection of the stay bolts of a boiler can be had by lawfully appointed inspectors and without requiring caps or other parts as the opening 20 in the cap 19 permits access to the bolt proper.

It will be noticed that by the arrangement described a shifting of the sheets 12 and 16 in the direction of their plane does not unduly strain the stay bolt 11 as the ball member or head 13 is free to turn in the socket 14. It will also be noticed that the stay bolt is free to expand and contract as the packing ring 17 yields sufficiently for the purpose. By the use of this packing ring the ball and socket joint connection is rendered tight to prevent the leakage of steam or water by way of the ball and socket joint.

The stay bolt illustrated in Figs. 4, 5 and 6 consists of a bolt 30 screwing at its inner end into the inner flue sheet (not shown), and the outer end of the stay bolt 30 is provided with a spherical head 31 engaging a socket 32 formed in the plug 33 screwing in the outer flue sheet 34. The plug 33 projects beyond the face of the flue sheet 34 and on its outer end screws exteriorly a cap 35 engaging the packing ring 36 fitting into the joint of the ball and socket connection 31, 32 to render the same steam-tight. The cap 35 is provided with a central opening 37 to allow inspection of the stay bolt at any time, the opening registering with the bolt opening 38, the same as above described in reference to the stay bolt shown in Figs. 2 and 3. The packing ring 36 is provided with a V-shaped inner edge 39 for snugly fitting into the ball and socket joint, and the outer end of the packing ring 36 is provided with an annular flange 40 fitting into the opening 37 of the cap 35.

The stay bolt shown and described is very simple in construction and insures a tight joint at the ball and socket connection and allows inspection of the bolt without removing any of the parts thereof.

Having thus described my invention, I claim as new and desire to secure by Letters Patent:

A stay bolt, comprising a bolt, a plug having a ball and socket joint connection with the said bolt, a packing ring fitting into the outer face of the said ball and socket joint connection, the said ring projecting outward beyond the face of the bolt, and a cap screwing on the plug against the said ring, the said cap having a central opening for gaining access to the bolt.

In testimony whereof I have signed my name to this specification in the presence of two subscribing witnesses.

HARRY A. LACERDA.

Witnesses:
CHAS. E. PETERS,
JNO. SEIM.